Patented June 29, 1937

2,085,705

UNITED STATES PATENT OFFICE 2,085,705

ABRASIVE WHEEL AND METHOD OF MANUFACTURE

Baalis Sanford and Duane E. Webster, Worcester, Mass., assignors to Norton Company, Worcester, Mass., a corporation of Massachusetts No Drawing. Application November 5, 1935, Serial No. 48,445

REISSUED

5 Claims. (Cl. 51—278)

The invention relates to abrasive bodies, and with regard to its more specific features to rubber bonded grinding wheels.

One object of the invention is to provide an improved method of manufacturing a rubber bonded grinding wheel or other abrasive body. Another object of the invention is to provide a superior rubber bonded grinding wheel having more uniform grit size of abrasive particles. Another object of the invention is to provide a rubber bonded grinding wheel of large grit size of abrasive particles, and a practical method of making the same. Other objects will be in part obvious or in part pointed out hereinafter.

The invention accordingly consists in the features of construction, combinations of elements, arrangements of parts, and in the several steps and relation and order of each of said steps to one or more of the others thereof, all as will be illustratively described herein, and the scope of the application of which will be indicated in the following claims.

As conducive to a clearer understanding of the present invention it is noted that for a long time the standard way of making a rubber bonded grinding wheel has included the step of mixing the abrasive grain with the rubber on the mill. Rubber in sheet form, upon which was thrown some sulphur, has been usually passed through between steel rollers several times, until somewhat plastic, being folded between passages to cause work to be done on it, and then abrasive grain has been thrown onto it and it has been given more and repeated passes between the rolls. Each time the rubber would be folded, and the grain would be added little by little until the result was a plastic mass of rubber impregnated with abrasive grain. This working of the rubber, called milling, would continue for some time involving, perhaps, upwards of one hundred passes between the rolls. The final result of this part of the process was a sheet of rubber with abrasive grains therein, which was of desired thickness and would be died out to form a grinding wheel in the "green" state, which when vulcanized would become a grinding wheel.

Such procedure has made a good grinding wheel for many purposes, but the great amount of mechanical work done on the rubber after the abrasive grain, or part thereof, was added has caused fracture of the individual grains, so that it has been virtually impossible to control or predict the exact grain size of a wheel so manufactured, or at least the grain sizes would be many in a given wheel. Furthermore, when dealing with large abrasive grit, the reduction of grain would be such that only a small proportion would remain as large sized grain. It may be desirable, for example, for some purposes to produce an organic bonded wheel with grain of grit size 12 mesh, but with no grain larger than 12 mesh in size; this could be done in a rubber bonded wheel only by also having in the wheel a large amount of grain of smaller size which, for some purposes, might be undesirable.

The foregoing in part accounts for the popularity of synthetic resinoid bonded wheels of recent years, for rubber has many excellent qualities and is reasonably inexpensive, and would fulfill most requirements were it not for the factors above mentioned and similar ones.

Considering now the procedure according to the present invention, we take a quantity of sheet rubber, crepe, caoutchouc, ball rubber or the like and mill it between rollers until it is plastic. We add the desired quantity of sulphur to make a hard rubber, for example 20% or more of sulphur by weight. When the rubber is milled sufficiently so that it is plastic and the sulphur is well distributed therein, we die out disks which in area correspond to the grinding wheel to be manufactured.

While wide variations may be made in carrying out the process so far as the thickness and number of disks are concerned, we will now give a preferred embodiment of the invention. Assuming that it is desired to produce a 12" diameter wheel 1" thick, we roll the sheet rubber to $\frac{1}{16}$" thick and die out of the order of 10 disks thereof. We provide a suitable mold for subjecting the disks to pressure. In the bottom of the mold we place one rubber disk. We then spread a weighed quantity of 12 grit size abrasive grain one layer thick upon the rubber. This may be done with an ordinary straight edge spreader or otherwise. We then place another sheet of rubber on top of the grain and spread another layer of grain of equal weight, the same mesh size and also one layer thick. We proceed in that fashion until all the rubber disks are in the mold, there being desirably no abrasive grain upon the top disk. We then place the top plate of the mold upon the top rubber disk and hot press to a given volume under a pressure of the order of several thousand pounds to the square inch. As a modification of the invention, we may apply the abrasive grain to the sheet instead of to the disks. In order to cause the grain to adhere while handling, we may make the sheet sticky by rubbing over it a small quantity of gasoline or other solvent. The grain may be sprinkled onto the sheet.

We now remove the mold, clamp it and place in an oven and vulcanize to the desired temperature for thermo-setting the rubber. It is possible to duplicate results very closely indeed by following the above given method of manufacture. Furthermore, the grit size of the abrasive grain put into the wheel is exactly that which is in the manufactured wheel, quite contrary to wheels made by the prior method herein described. If every grain put into this wheel is 12 grit size, then substantially every abrasive grain in the finished wheel is 12 grit size.

The mention of 12 grit abrasive grain is for illustration of certain advantages of the invention and in its broader aspects the invention is not limited to any particular size of abrasive grain. Five hundred mesh grit size and finer may be used, if desired, and grains larger than 12 grit size may be used, if desired, and any intermediate size whatsoever. Furthermore, the invention is in no wise limited to the particular abrasive material used, for example alumina, silicon carbide, diamonds, garnet, emery, boron carbide, other carbide grains, and any variety of quartz may be employed. The invention has particular advantage when carried out with diamond grain, otherwise known as bort, in so much as there is little danger of grain being lost in the process of manufacture. It will be appreciated that according to the prior method herein described an extremely valuable abrasive grain would not be used because the method inevitably results in waste and loss of abrasive grain, at least as heretofore carried out in practice.

In the application of pressure to the several rubber disks with abrasive grain therebetween, the grain is forced into the rubber and a uniform structure of the wheel results. It is preferable to have the thickness of the sheets and the size of abrasive grain bear some relationship to each other, as indicated by the foregoing example. The exact relationship will depend upon the structure desired with respect to percentage bond content. Within these limits it is desired to make the sheets as thick as possible relative to the abrasive grains in order to coat every part of the grains with some bond.

It will thus be seen that there has been provided by this invention a method and an article in which the various objects hereinabove set forth together with many thoroughly practical advantages are successfully achieved. As various possible embodiments might be made of the mechanical features of the above invention and as the art herein described might be varied in various parts, all without departing from the scope of the invention, it is to be understood that all matter hereinbefore set forth is to be interpreted as illustrative and not in a limiting sense.

We claim:—

1. Method of making rubber bonded abrasive bodies which comprises forming rubber into a sheet, dieing out the sheet into desired shapes, introducing the shapes into a mold with a vulcanizing agent, after the rubber is in sheet form spreading abrasive grain thereon, the abrasive grain being distributed throughout the mold and in contact with each shape, pressing and vulcanizing.

2. Method of making a rubber bonded abrasive article which comprises producing a sheet of plasticized rubber mixed with a vulcanizing agent, making one surface thereof sticky with a solvent, sprinkling on a quantity of abrasive grain, dieing out shapes from the sheet, introducing the shapes with the abrasive grains thereon into a mold, pressing the shapes, thus pressing the abrasive grain into them, and vulcanizing the pressed body resulting therefrom.

3. Method of making rubber bonded abrasive bodies which comprises taking a quantity of rubber and a vulcanizing agent, treating the rubber to make it so plastic that it can be readily mixed with abrasive grain, rolling the rubber with the vulcanizing agent into sheet form, dieing out shapes from the sheet, placing the sheets in a mold, introducing abrasive grain upon the sheets as they are placed in the mold, applying pressure, and vulcanizing.

4. Method of making rubber bonded abrasive bodies which comprises taking a quantity of rubber and a vulcanizing agent, applying energy to the rubber and the vulcanizing agent together to make them so plastic that they can be be readily mixed with abrasive grain, forming the mixture into sheet form, dieing out shapes from the sheet, covering each sheet with abrasive grain, pressing the sheets together and vulcanizing.

5. Method of making rubber bonded abrasive bodies which comprises taking a quantity of rubber and a vulcanizing agent, applying energy to them to make them so plastic that they can be readily mixed with abrasive grain, forming the mixture into sheet form, dieing out shapes from the sheet, covering each shape with abrasive grain one layer thick, pressing the shapes together, and vulcanizing.

BAALIS SANFORD.
DUANE E. WEBSTER.